United States Patent
Kojima et al.

(10) Patent No.: US 10,625,238 B2
(45) Date of Patent: Apr. 21, 2020

(54) WATER-RESISTANT SULFUR COMPOUND ADSORBENT

(71) Applicant: JGC CATALYSTS AND CHEMICALS LTD., Kanagawa (JP)

(72) Inventors: Chihiro Kojima, Kitakyushu (JP); Takahiro Yashima, Kitakyushu (JP); Kaoru Takahashi, Niigata (JP); Atsushi Okita, Ibaraki (JP); Kazunori Honda, Ibaraki (JP)

(73) Assignee: JGC CATALYSTS AND CHEMICALS LTD., Kanagawa (JP)

( * ) Notice: Subject to any disclaimer, the term of this patent is extended or adjusted under 35 U.S.C. 154(b) by 0 days.

(21) Appl. No.: 16/616,129

(22) PCT Filed: May 31, 2018

(86) PCT No.: PCT/JP2018/020895
§ 371 (c)(1),
(2) Date: Nov. 22, 2019

(87) PCT Pub. No.: WO2018/221633
PCT Pub. Date: Dec. 6, 2018

(65) Prior Publication Data
US 2020/0078763 A1    Mar. 12, 2020

(30) Foreign Application Priority Data
May 31, 2017  (JP) ................. 2017-107680

(51) Int. Cl.
*B01J 20/06* (2006.01)
*B01J 20/24* (2006.01)
*B01J 20/30* (2006.01)
*C02F 1/28* (2006.01)
*B01J 20/28* (2006.01)
*C02F 101/10* (2006.01)

(52) U.S. Cl.
CPC .............. *B01J 20/06* (2013.01); *B01J 20/24* (2013.01); *B01J 20/28059* (2013.01); *B01J 20/28061* (2013.01); *B01J 20/3007* (2013.01); *C02F 1/288* (2013.01); *C02F 1/281* (2013.01); *C02F 1/286* (2013.01); *C02F 2101/101* (2013.01)

(58) Field of Classification Search
CPC ...... B01J 20/06; B01J 20/24; B01J 20/28059; B01J 20/28061; B01J 20/3007; C02F 1/288; C02F 1/281; C02F 1/286; C02F 2101/101
USPC ........................................................ 502/401
See application file for complete search history.

(56) References Cited

U.S. PATENT DOCUMENTS

| 6,447,576 B1 | 9/2002 | Otsuka et al. |
| 2009/0272675 A1 | 11/2009 | Ratnasamy et al. |
| 2013/0216833 A1 | 8/2013 | Logli et al. |

FOREIGN PATENT DOCUMENTS

| JP | H03-213115 A | 9/1991 |
| JP | H05-084283 A | 4/1993 |
| JP | H05-293366 A | 11/1993 |
| JP | H07-118668 A | 5/1995 |
| JP | H07-313867 A | 12/1995 |
| JP | H10-249144 A | 9/1998 |
| JP | 2001-190965 A | 7/2001 |
| JP | 2003-336085 A | 11/2003 |
| JP | 2006-271966 A | 10/2006 |
| JP | 2012-530790 A | 12/2012 |
| JP | 2013-536071 A | 9/2013 |

OTHER PUBLICATIONS

International Search Report dated Jul. 31, 2018 filed in PCT/JP2018/020895.
Office Action dated Mar. 6, 2019 for the corresponding Japanese Patent Application No. 2018-558444.
Decision to Grant dated Apr. 16, 2019 for the corresponding Japanese Patent Application No. 2018-558444.

*Primary Examiner* — Edward M Johnson
(74) *Attorney, Agent, or Firm* — Pearne & Gordon LLP

(57) ABSTRACT

Provided is a water-resistant sulfur compound adsorbent having a crushing strength that is less likely to be reduced even when used in a process including moisture. A certain amount of cellulose derivative is contained in the sulfur compound adsorbent containing a copper component for adsorbing a sulfur compound. This imparts water resistance to the adsorbent. As a result, it is possible to obtain the water-resistant sulfur compound adsorbent having the crushing strength that is less likely to be reduced even when used in the process including moisture.

5 Claims, No Drawings

WATER-RESISTANT SULFUR COMPOUND ADSORBENT

TECHNICAL FIELD

The present invention relates to an adsorbent for adsorbing and removing sulfur compounds contained in various processes.

BACKGROUND ART

The sulfur compounds degrade equipment and catalyst used in the processes such as petroleum refining processes and petrochemical processes. Or, sulfur oxides generated during combustion cause inconveniences such as causing acid rain. Therefore, the sulfur compounds are regarded as a problem. In particular, the sulfur compounds contained in raw materials used in the processes are regarded as the problem. Therefore, various methods have been studied to remove the sulfur compounds.

As methods for removing the sulfur compounds contained in the raw materials used in the petroleum refining processes, the petrochemical processes and the like, a method for recovering sulfur from the sulfur compounds decomposed using the catalyst, a method for removing the sulfur compounds adsorbed on the adsorbent, and the like are mainly known.

An example of a method for decomposing the sulfur compounds using the catalyst is a hydrodesulfurization method. In the hydrodesulfurization method, the sulfur compounds are decomposed by hydrogen at a high temperature and in presence of the catalyst. This method is useful as a method for processing the raw materials containing a high concentration of sulfur compounds. However, it is pointed out that the method has problems such as using the equipment for supplying hydrogen, requiring a high temperature of 300 to 400° C., and complicated handling of the catalyst in a catalytic reaction (PATENT LITERATURE 1). In addition, the raw material and hydrogen may also react to each other to produce another compound (byproduct). Therefore, the hydrodesulfurization method also has a problem that it cannot be used in a process that should avoid such a reaction. For these reasons, the hydrodesulfurization method is generally widely used in the petroleum refining processes.

On the other hand, in the method for removing the sulfur compounds adsorbed on the adsorbent, the raw material containing the sulfur compounds flows in a tower filled with the adsorbent under condition of room temperature to 400° C. This method is characterized in that it is simple, need not a hydrogen supply equipment, and can remove the sulfur compounds to the order of ppm or less. Known adsorbents for the sulfur compounds include the adsorbent that physically adsorb the sulfur compounds and the adsorbent that chemically adsorb them. Alumina is known as the physical adsorbent. Among chemical adsorbents, the adsorbent containing zinc oxide is known as the adsorbent used at high temperatures. The adsorbent containing copper oxide is known as the adsorbent that can be used even at room temperature.

However, when processing the raw material containing a high concentration of sulfur compounds, there is a problem that frequency of replacement of the adsorbent increases. In addition, there are also problems such as different adsorptive power depending on the type of sulfur compound. For these reasons, the method using the adsorbent is generally widely used in the petrochemical processes (PATENT LITERATURE 2).

The sulfur compound adsorbent is generally required to have a high sulfur compound adsorption rate and a large sulfur compound adsorption amount. Further, the sulfur compound adsorbent used for industry is also required to have, for example, physical characteristics such as mechanical strength in addition to the above-described chemical characteristics. It is known that the sulfur compound adsorbent having a low mechanical strength is generally easily pulverized and crushed. For example, PATENT LITERATURE 3 discloses that the sulfur compound adsorbent used in a liquid phase is easily crushed, and therefore a high crushing strength of 4 kg or more is required.

CITATION LIST

Patent Literature

PATENT LITERATURE 1: JP-A-07-118668
PATENT LITERATURE 2: JP-A-03-213115
PATENT LITERATURE 3: JP-A-05-293366

SUMMARY OF THE INVENTION

Problems to be Solved by the Invention

However, even if a conventional sulfur compound adsorbent has such a high crushing strength, there is a problem that the crushing strength that is gradually reduced during use for a long period of, for example, 1 to 2 years causes pulverization and collapse.

The present inventors have examined the cause of reduction in the crushing strength of the sulfur adsorbent. As a result, it was found that a trace amount of water contained in the raw material used in the various processes is the cause of reduction in the crushing strength. The present invention solves this new problem. That is, a certain amount of cellulose derivative contained in the adsorbent increases consolidation strength between particles constituting the adsorbent and imparts water resistance to the adsorbent. This provides the water-resistant sulfur compound adsorbent having a crushing strength that is not easily reduced even in the processes including moisture, and enabling long-term use.

Solution to the Problems

The water-resistant sulfur compound adsorbent of the present invention (hereinafter also referred to as the adsorbent of the present invention) contains a cellulose derivative together with copper components for adsorbing the sulfur compounds.

The adsorbent of the present invention contains the cellulose derivative together with the copper components. Thus, the adsorbent of the present invention has excellent water resistance, the crushing strength that is not easily reduced even when used in the processes including moisture, and a property difficult to be pulverized and crushed.

Effects of the Invention

In the processes for removing the sulfur compounds contained in various gases, oils and the like (hereinafter also referred to as process raw materials) such as conventional industrial gas, natural gas, and petroleum fractions, the adsorbent of the present invention has a remarkable effect particularly on the process raw materials containing a trace amount of water. The crushing strength of the adsorbent of the present invention is less likely to be reduced even when used in the processes including moisture. Thus, the pulverization and collapse are suppressed. In addition, increase in differential pressure, drift and the like are less likely to occur. Therefore, the adsorbent of the present invention can be used for a long time even when used in the processes including moisture.

DESCRIPTION OF THE EMBODIMENTS

The present invention will be specifically described based on embodiments below.

[Adsorbent of the Present Invention]

An adsorbent of the present invention is a sulfur compound adsorbent containing a cellulose derivative together with copper components for adsorbing sulfur compounds. The cellulose derivative fixes the copper components to each other, or fixes the copper component and a carrier to each other to increase strength of the entire adsorbent. Therefore, even if the adsorbent of the present invention is used for a process raw material containing moisture, its crushing strength is less likely to be reduced. Further, the adsorbent is less likely to be pulverized and crushed. Furthermore, it is considered that the cellulose derivative not only increases the crushing strength of the adsorbent of the present invention, but also has an effect of blocking moisture from entering inside (bonding surface of particles inside a molded body) of the adsorbent of the present invention. Therefore, even if the adsorbent of the present invention is immersed in water for a certain period of time, the crushing strength is less likely to be reduced. Specifically, for example, among Examples described below, in Example 1 of the present invention, a retention rate of the crushing strength after being immersed in water for the certain period of time is 86%. On the contrary, in Comparative Example 1 which does not contain the cellulose derivative, the retention rate of the crushing strength is 20%. It is shown that the adsorbent of the present invention has a remarkably high retention rate of the crushing strength and excellent water resistance.

The cellulose derivative contained in the adsorbent of the present invention is preferably methylcellulose in which some of hydrogen atoms of hydroxyl groups of cellulose are substituted with methyl groups, hydroxypropyl cellulose substituted with hydroxypropyl groups, or hydroxyethyl cellulose substituted with hydroxyethyl groups. Hydroxypropyl methylcellulose is particularly preferred.

A content of methoxy groups contained in hydroxypropyl methylcellulose is preferably in a range of 1 to 2 as an average number of hydroxyl groups substituted with methoxy groups per glucose ring unit of cellulose. The adsorbent of the present invention containing hydroxypropyl methylcellulose having a methoxy group content in this range has higher water resistance. Further, the content of hydroxypropoxy groups contained in hydroxypropyl methylcellulose is preferably 0.15 or more and 0.25 or less in terms of average number of moles of hydroxypropoxy groups added to the glucose ring per glucose ring unit of cellulose.

Whether the cellulose derivative is contained in the adsorbent can be confirmed using a general structure analysis method for organic compounds. For example, if it can be specified that organic substances contained in the adsorbent eluted with a solvent include an organic substance having a cellulose derivative structure by using a conventionally known structural analysis method such as H-NMR, IR, or mass spectrum, it can be determined that the adsorbent contains the cellulose derivative.

The content of the cellulose derivative contained in the adsorbent of the present invention is preferably 0.5 wt % or more and 5 wt % or less, and particularly preferably 1 wt % or more and 3 wt % or less based on total weight of the adsorbent. If the content of the cellulose derivative contained in the adsorbent of the present invention is too small, the water resistance is lowered, which is not preferred. On the other hand, if the content is too large, the copper component contained in the adsorbent of the present invention may be excessively coated to prevent the sulfur compound from being adsorbed, which is not preferred.

The content of the cellulose derivative can be measured by a conventionally known method. For example, carbon content can be measured by a high-frequency induction heating combustion-infrared absorption spectrometer. The content of the cellulose derivative can be calculated from the obtained carbon content. When the organic substance other than the cellulose derivative is contained, the type and ratio of contained organic substance can be specified using the above-mentioned structure analysis method for organic compounds. And the content of the cellulose derivative can be calculated using this ratio and the above-mentioned carbon content. Further, the content of the cellulose derivative may be back-calculated from a charged amount of the organic substance used as the raw material.

The adsorbent of the present invention preferably contains an inorganic binder together with the cellulose derivative. Preferable examples of the inorganic binder contained in the adsorbent of the present invention include inorganic compounds having a large amount of OH group on a surface of bentonite, alumina, silica or the like. The silica derived from silica sol is particularly preferably contained. The silica derived from silica sol has a large number of silanol groups on its surface. The silanol groups are easily combined by interaction with OH groups contained in the cellulose derivative. Therefore, the crushing strength of the adsorbent of the present invention is increased. At the same time, the cellulose derivative is less likely to dissolve into the process raw material and water. When the cellulose derivative contained in the adsorbent of the present invention is in a state of being bonded to the inorganic binder by interaction as described above, the crushing strength and the water resistance are increased.

The content of the inorganic binder contained in the adsorbent of the present invention is preferably 1 wt % or more and 10 wt % or less, and more preferably 3 wt % or more and 7 wt % or less in terms of oxide based on the total weight of the adsorbent. When the content of the inorganic binder is within this range, the above-described operational effects can be maximized. The content of the inorganic binder can be quantified, for example, by general quantitative analysis such as ICP emission analysis, atomic absorption analysis, or fluorescent X-ray analysis.

The adsorbent of the present invention contains the copper component for adsorbing the sulfur compounds. The copper component may be any one of metallic copper, copper oxide, a copper compound having a property of adsorbing the sulfur compounds, or a form in which they are mixed. The metallic copper has a risk of ignition when handled in air. Therefore, copper used for the adsorbent of the present invention is preferably copper oxide.

The content of the copper component contained in the adsorbent of the present invention is preferably 30 wt % or more and 70 wt % or less, and more preferably 40 wt % or more and 60 wt % or less in terms of CuO. If the content of the copper component is too small, an adsorption amount of the sulfur compound is reduced, which is not preferred.

Even if the content of the copper component is too large, the adsorption amount of the sulfur compound does not increase so much, however, price of the adsorbent is expensive. Therefore, the copper content is preferably in the above range.

The adsorbent of the present invention preferably contains the carrier. The adsorbent of the present invention does not necessarily contain the carrier. Even in that case, the operational effects of the present invention can be obtained. However, the carrier supporting the copper component in a dispersed manner is preferred because it increases the adsorption amount and an adsorption rate of the sulfur compound. The carrier contained in the adsorbent of the present invention is preferably an inorganic substance. Examples of inorganic substances that can be used include silica, alumina, titania, diatomaceous earth, zinc oxide and the like. Note that boehmite alumina is especially preferred as the carrier used for the adsorption agent of this invention. The boehmite alumina has a large amount of OH group on its surface. The OH groups are more likely to be combined with the OH groups of the cellulose derivative. Therefore, the adsorbent containing the boehmite alumina and the cellulose derivative has a high crushing strength and water resistance. A specific surface area of the support is preferably at least 50 $m^2/g$ or more, and particularly preferably 100 $m^2/g$ or more. If the specific surface area of the support is too small, dispersibility of the supported copper component is deteriorated and the adsorption amount of the sulfur compound may be reduced, which is not preferred.

The specific surface area of the adsorbent of the present invention is preferably 30 $m^2/g$ or more, more preferably 100 $m^2/g$ or more and 250 $m^2/g$ or less. If the specific surface area of the adsorbent of the present invention is too small, the adsorption amount of sulfur compound may be reduced, which is not preferred. The specific surface area can be measured, for example, by a conventionally known measurement method such as a BET multipoint method or a BET single point method.

The crushing strength of the adsorbent of the present invention is preferably 20 N or more, and more preferably 30 N or more per pellet. If the crushing strength of the adsorbent of the present invention is too low, pulverization and collapse of the adsorbent tend to occur, which is not preferred. The crushing strength can be measured, for example, by a method described below in Examples. The adsorbent of the present invention contains the cellulose derivative. Thus, the crushing strength of 20 N or more per pellet can be easily achieved.

In the adsorbent of the present invention, the retention rate ($I/I_O$) of the crushing strength ($I_O$) before being immersed in water based on the crushing strength (I) after being immersed in water for 900 hours is preferably 50% or more and 100% or less, and particularly preferably 75% or more and 100% or less. In the present invention, the retention rate can be used as a scale for evaluating the water resistance described above. If the retention rate is too low, the crushing strength is significantly reduced under influence of moisture when the adsorbent is used in a process including moisture. As a result, the pulverization and collapse are caused. Therefore, it is not preferred that the retention rate ($I/I_O$) of the crushing strength ($I_O$) is too low.

The adsorbent of the present invention can have a conventionally known shape such as a spherical shape, a columnar shape, a trilobes shape, a quadrilobes shape, or the like. The shape and size are preferably adjusted to have a larger outer surface area while retaining the crushing strength. For example, the adsorbent of the present invention preferably has the columnar shape and has a diameter of 1 mmφ or more and 3 mmφ or less, and a height of 1 mmH or more and 7 mmH or less. In this case, the adsorbent has a larger outer surface area while retaining the crushing strength.

The sulfur compound of the adsorbent of the present invention has an adsorption rate constant of at least 0.001 $sec^{-1}$ or more as a suitable sulfur compound adsorbent. If the adsorption rate of the sulfur compound is lower than 0.001 $sec^{-1}$, the sulfur compound contained in the process raw material may not be sufficiently removed. The adsorption rate constant of the sulfur compound can be calculated by a method described in Examples described below.

The adsorbent of the present invention can remove the sulfur compounds contained in the various process raw materials. In particular, the adsorbent of the present invention exhibits a remarkable effect on the process raw materials containing a trace amount of water. When a conventional adsorbent is used for the process raw materials containing such a trace amount of water, the crushing strength is gradually reduced under the influence of moisture. And the pulverization and collapse of the adsorbent tend to occur. However, the adsorbent of the present invention contains the cellulose derivative. The particles constituting the adsorbent are consolidated to each other by the cellulose derivative. Therefore, the adsorbent of the present invention has a high crushing strength. Further, the adsorbent of the present invention is given the water resistance. Therefore, even when the adsorbent is used for the process raw materials containing a trace amount of water, the crushing strength is less reduced. The content of water contained in the process raw material for which the adsorbent of the present invention is used varies depending on the type of raw material, and is generally 0.1 ppm or more and 1000 ppm or less.

The adsorbent of the present invention can be suitably used especially for liquid process raw materials among the process raw materials described above. Resistance when the liquid process raw material and the adsorbent contact each other is large. Therefore, the pulverization and collapse of the adsorbent are more likely to occur than when the gaseous process raw material and the adsorbent contact each other. However, in the adsorbent of the present invention, the particles constituting the adsorbent are consolidated to each other. Thus, the adsorbent has a high crushing strength and water resistance. Therefore, even if the adsorbent is used for the liquid process raw materials, the adsorbent is less likely to be pulverized and crushed. Among the above-mentioned process raw materials, the adsorbent of the present invention is suitably used particularly for the process raw material containing propylene.

The adsorbent of the present invention removes the sulfur compounds contained in the process raw materials. Common sulfur compounds can be adsorbed and removed by the adsorbent of the present invention. For example, sulfur compounds such as hydrogen sulfide, alkylthiophenes, mercaptans, and carbonyl sulfide (COS) can be adsorbed. The adsorbent of the present invention is particularly excellent in ability to adsorb the carbonyl sulfide among these general sulfur compounds.

The adsorbent of the present invention contains the cellulose derivative. Therefore, the adsorbent has a feature that the crushing strength is hardly reduced even when used for the process raw material containing a trace amount of water. Conventionally, the adsorbent containing the copper compound as a component for adsorbing the sulfur compound is known. However, the conventional adsorbent does not contain the cellulose derivative. This is because such a conventional sulfur compound adsorbent is generally produced by a method in which the copper compound is impregnated and supported on the carrier and then the carrier is calcined, or by a method in which the copper compound and the carrier are mixed and molded and then its molded body is calcined. Even if the cellulose derivative is contained as an organic binder or lubricant together with the copper compound, they are burned, decomposed or altered in a calcining step. Therefore, the adsorbent finally obtained does not contain the cellulose derivative.

On the other hand, after the cellulose derivative is contained together with the copper component for adsorbing the sulfur compound in the adsorbent of the present invention, the firing is not performed. Thus, the adsorbent contains a certain amount of cellulose derivative. Therefore, unlike the conventional sulfur compound adsorbent, even when the adsorbent of the present invention is used in the processes including a trace amount of water, the crushing strength is less likely to be reduced. Further, the adsorbent has high water resistance. The water resistance is determined by the retention rate of the crushing strength after the adsorbent is immersed in water for the certain period of time. A specific measurement method is shown in Examples.

[Production Method]

A method for producing the adsorbent of the present invention (hereinafter, the production method of the present invention) will be described in detail.

The production method of the present invention includes a step of obtaining a raw material mixture by mixing the copper component such as copper oxide and the cellulose derivative, and a step of molding the raw material mixture. Note that the manufacturing method of the present invention does not include a step of calcining the raw material mixture. Hereinafter, an example in which the copper oxide is used as the copper component will be shown. Note that the copper component is not limited to the copper oxide.

The copper oxide used in the production method of the present invention may be obtained by firing the copper compound, or may be synthesized in an aqueous solution. When the copper compound is fired, the copper compound such as copper chloride, copper carbonate, or copper nitrate is fired at 300° C. or higher and 500° C. or lower. Thus, the copper oxide is obtained. Further, when the copper oxide is synthesized in the aqueous solution, the copper oxide can be obtained by heating copper hydroxide dispersed in the aqueous solution to 50° C. or higher.

In the production method of the present invention, the carrier may be mixed in the step of mixing the copper oxide and the cellulose derivative. According to the production method of the present invention, the operational effects of the present invention can be obtained even if the carrier is not necessarily contained. However, it is preferable to disperse and carry the copper component on the carrier because the adsorption amount and the adsorption rate of the sulfur compound increase. The carrier used in the production method of the present invention is preferably the inorganic substance. Examples of the inorganic substance that can be used include silica, alumina, silica-alumina, titania, diatomaceous earth, zinc oxide and the like. As the carrier used for the adsorbent of the present invention, the boehmite alumina is especially preferred. The boehmite alumina has a large amount of OH group on its surface. Thus, the boehmite alumina is more easily bonded to the OH groups of the cellulose derivative. Therefore, the crushing strength and the water resistance of the adsorbent containing the boehmite alumina and the cellulose derivative are increased. The specific surface area of the carrier is preferably at least 50 m$^2$/g or more, and particularly preferably 100 m$^2$/g or more. If the specific surface area of the carrier is too small, the dispersibility of the supported copper component is deteriorated. As a result, the adsorption amount of sulfur compound may be reduced. Therefore, it is not preferred that the specific surface area of the carrier is too small.

In the production method of the present invention, the inorganic binder is used together with the cellulose derivative. This further improves the water resistance. Preferred examples of the inorganic binder used in the production method of the present invention include the inorganic compounds having a large amount of OH group on the surface of bentonite, alumina, silica, or the like. The silica derived from silica sol is particularly preferably contained.

In the production method of the present invention, as a method of mixing the copper oxide and the cellulose derivative, or a method of further mixing the inorganic binder and the carrier with them, any method capable of uniformly mixing the components can be used. Conventionally known methods may be used. For example, they can be mixed using a kneader, a mixer or the like. The raw material mixture obtained after mixing may be powdery, block-like, or clay-like with water added during mixing. The powdery raw material mixture can be molded into a desired shape by compression molding such as tableting. The clay-like raw material mixture can be molded into the desired shape by extrusion molding. In this molding process, the lubricant can be used as necessary to improve moldability. For example, in the case of compression molding, graphite may be added so that the powdery raw material mixture is easily supplied to a mold. When the clay-like raw material mixture is extruded and molded, the lubricant such as cellulose or oleic acid can be added to reduce extrusion resistance. By using the lubricant in this way, productivity of the molding process can be improved.

When the moisture remains in the molded body after molding, the moisture can also be removed by drying at a temperature of 200° C. or less. At this time, when the molded body after molding is heated to a temperature higher than 200° C., the cellulose derivative is burned, decomposed, or altered, and thus the operational effects of the present invention may not be obtained. In particular, when calcined at a high temperature of 300° C. or higher, the cellulose derivative is completely burned, decomposed, or altered. Therefore, after the cellulose derivative is added, calcining at the temperature of 300° C. or higher is not performed.

EXAMPLES

Examples of the present invention are shown below together with Comparative Examples. Note that the present invention is not limited to these examples.

Example 1

A mother liquor was prepared by dissolving 231 g of sodium hydroxide in 5.8 kg of ion-exchanged water. Next, an adding liquid was prepared by dissolving 676 g of copper sulfate pentahydrate in 2.6 kg of ion-exchanged water. The mother liquor and the adding liquid, which were separately heated, were mixed to produce a copper oxide precipitate. The copper oxide precipitate was separated by filtering a slurry containing the copper oxide precipitate. Thereafter, the precipitate was sufficiently washed to obtain a copper oxide precipitate cake. The precipitate cake was dispersed in 4.0 kg of ion-exchanged water to obtain a copper oxide slurry. Powdery copper oxide was obtained by drying the copper oxide slurry.

Next, 200 g of the copper oxide, 200 g of commercially available boehmite alumina (specific surface area: 280 m²/g) as the carrier, 4 g of hydroxypropyl methylcellulose (produced by Shin-Etsu Chemical Co., Ltd., product name; METOLOSE 90SH, methoxy group content 1.4, hydroxypropoxy group content 0.2) as the cellulose derivative, 4 g of cellulose (produced by Yuken Industry Co., Ltd.: YB-154) as the lubricant, 100 g of silica sol (produced by JGC Catalysts and Chemicals Ltd., product name; S-20L, Si concentration; 20 wt % (in terms of SiO2)) as the inorganic binder, and 125 g of ion-exchanged water were charged into the mixer and mixed uniformly to obtain the raw material mixture.

The raw material mixture charged into an extrusion molding machine was extruded and molded into a cylindrical shape having a diameter of 1.8 mmφ and a height of 3 to 5 mm, to obtain the molded body. The molded body was dried with an electric dryer at 120° C. for 16 hours, to obtain the sulfur compound adsorbent. Composition of the sulfur compound adsorbent was analyzed by the following measurement method. Results are shown in Table 1.

<Method for Measuring Composition>

The sulfur compound adsorbent was pulverized into powders. Thereafter, the obtained sample was put into a pressure molding ring and subjected to pressure molding at a molding pressure of 30 MPa for 3 minutes. The molded sample was set in a fluorescent X-ray analyzer (manufactured by Rigaku Corporation, ZSX100e) and measured by order (semi-quantitative) analysis.

As the organic binder content of the obtained sulfur compound adsorbent, a value back-calculated from the charged amount was used. The results are shown in Table 1. Note that the content of the cellulose derivative may be back-calculated, for example, from a value of carbon content in the sulfur compound adsorbent analyzed by the following method.

<Method for Measuring Organic Binder Content>

The sulfur compound adsorbent was pulverized into powders. Thereafter, the carbon content was measured using the high-frequency induction heating combustion-infrared absorption spectrometer (manufactured by LECO Corporation, CS230). A calibration curve was prepared using standard steel samples. An average value of three measurements was taken as the carbon content of the sample.

The adsorption rate constant of the sulfur compound (carbonyl sulfide) of the produced sulfur compound adsorbent was analyzed by the following measurement method. The results are shown in Table 1.

<Method for Evaluating Adsorption Rate Constant of Carbonyl Sulfide (COS)>

First, a simulation solution (COS concentration 10 ppm/1-hexene) was prepared. Next, the sulfur compound adsorbent was set in a reaction tube so that its layer height was 8 cm. The reaction tube was attached to a COS adsorption test apparatus. Next, pretreatment was performed at 170° C. for 1 hour under a nitrogen flow. Then, the reaction tube was cooled to room temperature. Thereafter, the prepared simulation solution was allowed to flow through the reaction tube at a supply rate of 5 g/min. The solution at an inlet and an outlet of the reaction tube was sampled every predetermined time, and the COS concentration was analyzed using a gas chromatograph (manufactured by Agilent Technologies, Inc., model 7890B) equipped with an SCD detector. The COS adsorption rate constant was calculated from a difference between an inlet COS concentration and an outlet COS concentration after 2 hours of flow.

The water resistance of the produced sulfur compound adsorbent was evaluated by the following measurement method. The results are shown in Table 1.

<Water Resistance Test>

A glass bottle filled with pure water was filled with several tens of grams of the sulfur compound adsorbent. The adsorbent was immersed for 900 hours at room temperature. Thereafter, the retrieved sulfur compound adsorbent was dried with the electric dryer at a temperature of 120° C. for 16 hours. Thus, the moisture contained in the sulfur compound adsorbent was removed.

Next, the crushing strength ($I_0$) of the sulfur compound adsorbent before being immersed in pure water and the crushing strength (I) of the sulfur compound adsorbent after being immersed in pure water were measured. The water resistance was evaluated by the retention rate ($I/I_0$) of the crushing strength. The crushing strength of the sulfur compound adsorbent was measured using a crushing strength meter (manufactured by Instron, model 3365). The average value of the crushing strength of 10 pellets was taken as the crushing strength. Regarding the columnar sulfur compound adsorbent, the crushing strength in a lateral direction (side surface of its column) was measured.

Example 2

Powdery copper oxide is obtained in the same manner as the Example 1. Next, 200 g of the copper oxide, 200 g of commercially available boehmite alumina (specific surface area: 280 m²/g) as the carrier, 4 g of hydroxypropyl methylcellulose (produced by Shin-Etsu Chemical Co., Ltd., product name; METOLOSE 90SH, methoxy group content 1.4, hydroxypropoxy group content 0.2) as the cellulose derivative, 4 g of cellulose (produced by Yuken Industry Co., Ltd.: YB-154) as the lubricant, 100 g of silica sol (produced by JGC Catalysts and Chemicals Ltd., product name; S-20L, Si concentration; 20 wt % (in terms of SiO2)) as the inorganic binder, and 125 g of ion-exchanged water were charged into the mixer and mixed uniformly to obtain the raw material mixture. Using the raw material mixture, the sulfur compound adsorbent was obtained in the same manner as in Example 1. Further, various analyses were performed in the same manner as in Example 1. The results are shown in Table 1.

Example 3

Powdery copper oxide is obtained in the same manner as the Example 1. Next, 200 g of the copper oxide, 200 g of commercially available boehmite alumina (specific surface area: 280 m²/g) as the carrier, 17 g of hydroxypropyl methylcellulose (produced by Shin-Etsu Chemical Co., Ltd., product name; METOLOSE 90SH, methoxy group content 1.4, hydroxypropoxy group content 0.2) as the cellulose derivative, 4 g of cellulose (produced by Yuken Industry Co., Ltd.: YB-154) as the lubricant, 100 g of silica sol (produced by JGC Catalysts and Chemicals Ltd., product name; S-20L, Si concentration; 20 wt % (in terms of SiO2)) as the inorganic binder, and 125 g of ion-exchanged water were charged into the mixer and mixed uniformly to obtain the raw material mixture. Using the raw material mixture, the sulfur compound adsorbent was obtained in the same manner as in Example 1. Further, various analyses were performed in the same manner as in Example 1. The results are shown in Table 1.

Example 4

Powdery copper oxide is obtained in the same manner as the Example 1. Next, 200 g of the copper oxide, 200 g of commercially available boehmite alumina (specific surface area: 280 m$^2$/g) as the carrier, 4 g of hydroxypropyl methylcellulose (produced by Shin-Etsu Chemical Co., Ltd., product name; METOLOSE 90SH, methoxy group content 1.4, hydroxypropoxy group content 0.2) as the cellulose derivative, 100 g of silica sol (produced by JGC Catalysts and Chemicals Ltd., product name; S-20L, Si concentration; 20 wt % (in terms of SiO2)) as the inorganic binder, and 125 g of ion-exchanged water were charged into the mixer and mixed uniformly to obtain the raw material mixture. Using the raw material mixture, the sulfur compound adsorbent was obtained in the same manner as in Example 1. Further, various analyses were performed in the same manner as in Example 1. The results are shown in Table 1.

Example 5

Powdery copper oxide is obtained in the same manner as the Example 1. Next, 160 g of the copper oxide, 240 g of commercially available boehmite alumina (specific surface area: 280 m$^2$/g) as the carrier, 4 g of hydroxypropyl methylcellulose (produced by Shin-Etsu Chemical Co., Ltd., product name; METOLOSE 90SH, methoxy group content 1.4, hydroxypropoxy group content 0.2) as the cellulose derivative, 4 g of cellulose (produced by Yuken Industry Co., Ltd.: YB-154) as the lubricant, 100 g of silica sol (produced by JGC Catalysts and Chemicals Ltd., product name; S-20L, Si concentration; 20 wt % (in terms of SiO2)) as the inorganic binder, and 150 g of ion-exchanged water were charged into the mixer and mixed uniformly to obtain the raw material mixture. Using the raw material mixture, the sulfur compound adsorbent was obtained in the same manner as in Example 1. Further, various analyses were performed in the same manner as in Example 1. The results are shown in Table 1.

Example 6

Powdery copper oxide is obtained in the same manner as the Example 1. Next, 120 g of the copper oxide, 280 g of commercially available boehmite alumina (specific surface area: 280 m$^2$/g) as the carrier, 4 g of hydroxypropyl methylcellulose (produced by Shin-Etsu Chemical Co., Ltd., product name; METOLOSE 90SH, methoxy group content 1.4, hydroxypropoxy group content 0.2) as the cellulose derivative, 4 g of cellulose (produced by Yuken Industry Co., Ltd.: YB-154) as the lubricant, 100 g of silica sol (produced by JGC Catalysts and Chemicals Ltd., product name; S-20L, Si concentration; 20 wt % (in terms of SiO2)) as the inorganic binder, and 175 g of ion-exchanged water were charged into the mixer and mixed uniformly to obtain the raw material mixture. Using the raw material mixture, the sulfur compound adsorbent was obtained in the same manner as in Example 1. Further, various analyses were performed in the same manner as in Example 1. The results are shown in Table 1.

Example 7

The mother liquor was prepared by dissolving 1090 g of 48 mass % aqueous sodium hydroxide solution in 7.1 kg of ion-exchanged water and further adding 460 g of zinc oxide. Next, the adding liquid was prepared by dissolving 1092 g of copper sulfate pentahydrate and 453 g of copper nitrate trihydrate in 5.8 kg of ion-exchanged water. The mother liquor and the adding liquid, which were separately heated, were mixed to produce the copper oxide precipitate containing zinc oxide. 44 g of graphite was added to the precipitate slurry. The precipitate containing graphite was separated by filtering the precipitate. Thereafter, the precipitate was sufficiently washed to obtain the precipitate cake. By drying the slurry obtained by dispersing the precipitation cake in 12 kg of ion-exchanged water, a powder product containing copper oxide, zinc oxide, and graphite was obtained.

Next, 400 g of the powder product, 4 g of hydroxypropyl methylcellulose (produced by Shin-Etsu Chemical Co., Ltd., product name; METOLOSE 90SH, methoxy group content 1.4, hydroxypropoxy group content 0.2) as the cellulose derivative, 20 g of bentonite as the inorganic binder, and 152 g of ion-exchanged water were charged into the mixer and mixed uniformly to obtain the raw material mixture. Using the raw material mixture, the sulfur compound adsorbent was obtained in the same manner as in Example 1. Further, the various analyses were performed in the same manner as in Example 1. The results are shown in Table 1.

Comparative Example 1

Powdery copper oxide is obtained in the same manner as the Example 1. Next, 200 g of the copper oxide, 200 g of commercially available boehmite alumina (specific surface area: 280 m$^2$/g) as the carrier, 100 g of silica sol (produced by JGC Catalysts and Chemicals Ltd., product name; S-20L, Si concentration; 20 wt % (in terms of SiO2)) as the inorganic binder, and 125 g of ion-exchanged water were charged into the mixer and mixed uniformly to obtain the raw material mixture. Using the raw material mixture, the sulfur compound adsorbent was obtained in the same manner as in Example 1. Further, various analyses were performed in the same manner as in Example 1. The results are shown in Table 1.

Comparative Example 2

Powdery copper oxide is obtained in the same manner as the Example 1. Next, 200 g of the copper oxide, 200 g of commercially available boehmite alumina (specific surface area: 280 m$^2$/g) as the carrier, 4 g of polyvinyl alcohol (molecular weight 1500), 100 g of silica sol (produced by JGC Catalysts and Chemicals Ltd., product name; S-20L, Si concentration; 20 wt % (in terms of SiO2)) as the inorganic binder, and 125 g of ion-exchanged water were charged into the mixer and mixed uniformly to obtain the raw material mixture. Using the raw material mixture, the sulfur compound adsorbent was obtained in the same manner as in Example 1. Further, various analyses were performed in the same manner as in Example 1. The results are shown in Table 1.

Comparative Example 3

The powder product containing copper oxide, zinc oxide, and graphite was obtained in the same manner as in Example 7. Next, 400 g of the powdered product, 20 g of bentonite as the inorganic binder, and 152 g of ion-exchanged water were charged into the mixer and mixed uniformly to obtain the raw material mixture. Using the raw material mixture, the sulfur compound adsorbent was obtained in the same manner as in Example 1. Further, the various analyses were performed in the same manner as in Example 1. The results are shown in Table 1.

of the adsorbents of Example 7 and Comparative Example 3 each having a slightly large columnar diameter are both 0.009 sec$^{-1}$. The adsorption rate constants of the sulfur

TABLE 1

| | | Example 1 | Example 2 | Example 3 | Example 4 | Example 5 | Example 6 | Example 7 | Comparative Example 1 | Comparative Example 2 | Comparative Example 3 |
|---|---|---|---|---|---|---|---|---|---|---|---|
| Shape | | Columnar 1.8 mmφ 3 to 5 mmH | Columnar 1.8 mmφ 3 to 5 mmH | Columnar 1.8 mmφ 3 to 5 mmH | Columnar 1.8 mmφ 3 to 5 mmH | Columnar 1.8 mmφ 3 to 5 mmH | Columnar 1.8 mmφ 3 to 5 mmH | Columnar 2.7 mmφ 3 to 5 mmH | Columnar 1.8 mmφ 3 to 5 mmH | Columnar 1.8 mmφ 3 to 5 mmH | Columnar 2.7 mmφ 4 to 7 mmH |
| Copper component | Compound | CuO | CuO | CuO | CuO | CuO | CuO | CuO | CuO | CuO | CuO |
| | Content [wt %] | 53.0 | 53.2 | 51.4 | 53.5 | 43.5 | 34.2 | 44.3 | 54.0 | 53.5 | 44.4 |
| Cellulose derivative or additive | Compound | HPMC | HPMC | HPMC | HPMC | HPMC | HPMC | HPMC | — | PVA | — |
| | Content [wt %] | 1 | 0.5 | 4 | 1 | 1 | 1 | 1 | 0 | 1 | 0 |
| Lubricant | Compound | Cellulose | Cellulose | Cellulose | — | Cellulose | Cellulose | Graphite | — | — | Graphite |
| | Content [wt %] | 1 | 1 | 1 | 0 | 1 | 1 | 3.8 | 0 | 0 | 3.8 |
| Carrier | Compound | Boehmite alumina | Boehmite alumina | Boehmite alumina | Boehmite alumina | Boehmite alumina | Boehmite alumina | ZnO | Boehmite alumina | Boehmite alumina | ZnO |
| | Content [wt %] | 42.0 | 42.2 | 40.7 | 42.4 | 50.4 | 59.5 | 50.0 | 42.8 | 42.4 | 50.2 |
| Inorganic binder | Compound | Silica | Silica | Silica | Silica | Silica | Silica | Bentonite | Silica | Silica | Bentonite |
| | Content [wt %] | 5.5 | 5.5 | 5.3 | 5.6 | 5.8 | 6.1 | 4.7 | 5.6 | 5.6 | 4.8 |
| Specific surface area [m$^2$/g] | | 158 | 161 | 140 | 160 | 171 | 204 | 36 | 160 | 150 | 37 |
| Crushing strength ($I_0$) [N/pellet] | | 45.8 | 42.0 | 46.5 | 44.3 | 47.7 | 47.8 | 35.5 | 30.2 | 40.8 | 13.8 |
| Retention rate of crushing strength ($I/I_0$) [%] | | 86 | 70 | 90 | 84 | 88 | 88 | 55 | 20 | 37 | Collapse during immersion |
| Adsorption rate constant of sulfur compound [sec$^{-1}$] | | 0.019 | 0.021 | 0.013 | 0.019 | 0.017 | 0.014 | 0.009 | 0.018 | 0.020 | 0.008 |

HPMC: Hydroxypropyl methylcellulose
PVA: Polyvinyl alcohol (molecular weight 1500)

As shown in Table 1, the retention rates ($I/I_0$) of the crushing strength after the adsorbents of Examples 1 to 7 are immersed in water for a certain period of time are all 55 to 90%. In contrast, the retention rates ($I/I_0$) of the crushing strength of the adsorbents of Comparative Examples 1 and 2 is respectively 20% and 37%. Moreover, the adsorbent of Comparative Example 3 collapses during immersion. Thus, the water resistance of the adsorbent of the present invention is remarkably excellent compared with the adsorbents of Comparative Examples 1 to 3.

The crushing strengths of the adsorbents of Examples 1 to 6 are 42.0 N to 47.8 N. In contrast, the crushing strengths of the adsorbents of Comparative Examples 1 and 2 having the same shape are respectively 30.2 N and 40.8 N. The crushing strengths of the adsorbents of Examples 1 to 6 are significantly increased compared with the adsorbents of Comparative Examples 1 and 2.

Further, Example 7 using bentonite as the inorganic binder together with the cellulose derivative is compared with Comparative Example 3 using bentonite as the inorganic binder without using a cellulose derivative. Then, the crushing strength of the adsorbent of Example 7 is 35.5 N. In contrast, the crushing strength of the adsorbent of Comparative Example 3 is 13.8 N. The crushing strength of the adsorbent of Example 7 is much higher than that of Comparative Example 3.

Furthermore, the adsorption rate constants of the sulfur compound of the adsorbents of Examples 1 to 6 is 0.013 sec$^{-1}$ to 0.021 sec$^{-1}$. In contrast, the adsorption rate constants of the adsorbents of Comparative Examples 1 and 2 are 0.018 sec$^{-1}$ to 0.020 sec$^{-1}$. The adsorption rate constants compounds are almost at the same level. Thus, although the adsorbent of the present invention contains the cellulose derivative, the adsorption rate constant of the sulfur compound is not reduced so much. On the other hand, the water resistance and the crushing strength are remarkably increased.

What is claimed is:

1. A water-resistant sulfur compound adsorbent (except the adsorbent containing activated carbon) for removing carbonyl sulfide from a liquid process raw material containing water and the carbonyl sulfide, comprising
a copper oxide as a copper component for adsorbing the carbonyl sulfide, wherein
a content of the copper component is in a range of 30 wt % or more and 70 wt % or less in terms of CuO, and
the adsorbent comprises a cellulose derivative in which a part of hydrogen atoms of a hydroxyl group of cellulose is substituted with one or more selected from methyl group, hydroxypropyl group, and hydroxyethyl group.

2. The water-resistant sulfur compound adsorbent according to claim 1, wherein
the cellulose derivative is hydroxypropyl methylcellulose.

3. The water-resistant sulfur compound adsorbent according to claim 2, wherein
the number of moles of hydroxypropoxy group contained in the hydroxypropyl methylcellulose is in a range of 0.15 or more and less than 0.25.

4. The water-resistant sulfur compound adsorbent according to claim 1, wherein a content of the cellulose derivative is in a range of 0.5 wt % or more and 5 wt % or less based on a total weight of the adsorbent.

5. The water-resistant sulfur compound adsorbent according to claim 4, wherein a retention rate ($I/I_0$) of crushing strength ($I_0$) before being immersed in water to the crushing strength (I) after being immersed in water for 900 hours is in a range of 50% or more and 100% or less.

\* \* \* \* \*